Patented May 25, 1937

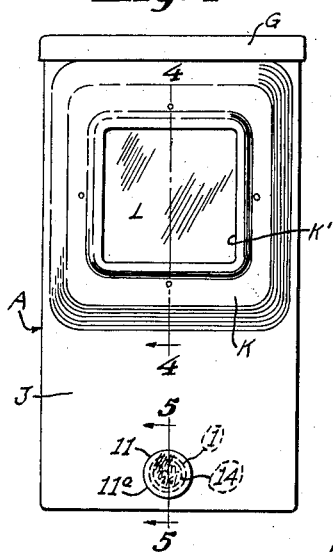
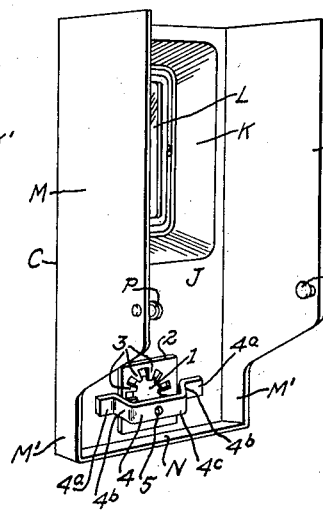
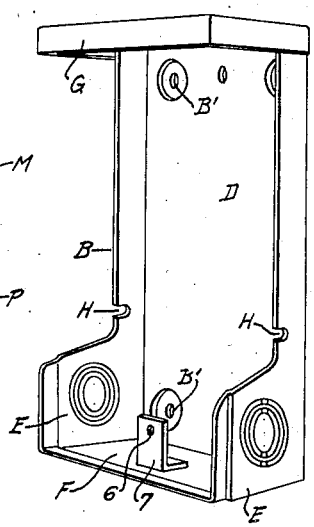
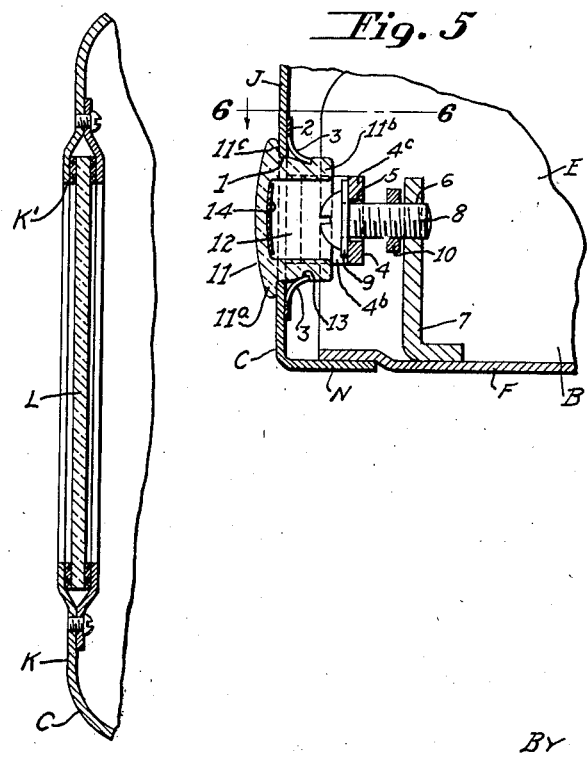
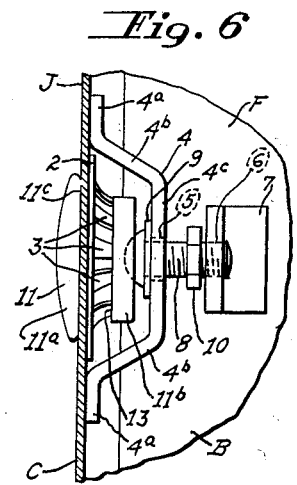

2,081,627

UNITED STATES PATENT OFFICE 2,081,627

METER BOX

Walter A. Heinrich, St. Louis, Mo., assignor to James R. Kearney Corporation, St. Louis, Mo., a corporation of Missouri Application April 9, 1936, Serial No. 73,455

5 Claims. (Cl. 40—2.2)

This invention relates generally to meter boxes, and more specifically to an improved meter box adapted for use in housing electric meters, the predominant object of the invention being to provide a meter box of this type which includes improved means for sealing the meter box so that unauthorized opening thereof, or attempts at such unauthorized opening of the meter box, may be detected.

Power companies are finding the problem of combating unauthorized current diversion a difficult one, and many companies have adopted the practice of locating all of their meters outside of the customers' premises and connecting them directly to the service lines ahead of the main switches and fuses. In doing this these companies are required to utilize thousands of meters which they have on hand which were designed for indoor installation. This has necessitated the use of metal meter boxes to house these indoor meters in outdoor locations, and an important requirement is that these meter boxes may be as nearly tamper-proof as possible, so that attempts at opening them by unauthorized persons may be readily detected.

I have therefore devised the improved meter box disclosed herein, which, briefly stated, includes an opening in a wall portion thereof through which a suitable tool is passed for the purpose of operating a fastening device located within the box when it is desired to open or close the box. This opening is closed by a seal formed preferably, though not necessarily, of glass, and when the seal is introduced in place in the opening to close the same it is engaged in such manner by a locking element located within the meter box that the seal may not be removed to give access to the fastening device through the opening without destroying the seal. Thus, if a representative of a power company finds on inspection of a meter box of the improved construction and arrangement disclosed herein that the seal is broken or cracked, he will know that the meter box has been tampered with. In order to provide an additional means of detecting tampering with a meter box of the improved construction of the present invention, a sticker may be applied to the inner face of the seal before it is introduced in place in the opening. This sticker will have applied to it in handwriting any suitable matter, such as the date on which the box was sealed and the initials of the power company representative who sealed the box. If, therefore, an unauthorized person should be able to obtain a duplicate of the seal which he might arrange in place in the opening after he had broken the original seal and gained access to the interior of the meter box, he would be faced with the additional difficult problem of imitating the hand writing which appeared on the sticker associated with the original seal. The failure to imitate the handwriting successfully would, of course, indicate that the meter box had been opened and that a duplicate seal had been arranged in the seal opening.

Fig. 1 is a front elevation of the improved meter box of the present invention.

Fig. 2 is a perspective of the front portion of the improved meter box.

Fig. 3 is a perspective of the base portion of the improved meter box.

Fig. 4 is an enlarged, fragmentary, vertical section on line 4—4 of Fig. 1.

Fig. 5 is an enlarged, fragmentary, vertical section on line 5—5 of Fig. 1.

Fig. 6 is a horizontal section on line 6—6 of Fig. 5.

In the drawing, wherein is shown for the purpose of illustration, merely, one embodiment of the invention, A designates the improved meter box generally. The meter box A comprises a base portion B and a front portion C, the rear wall of the base portion being provided with suitably located apertures B' through which fastening devices may be passed for the purpose of securing said base portion to a support. The base portion B includes a rear wall D heretofore mentioned, side walls which are rather narrow except at their lower portions where forwardly extended portions E of increased width are provided, a bottom wall F, and a rigid top wall or cover G, which is provided with downwardly extended flanges at the opposite sides and front of said top wall or cover. As shown to the best advantage in Fig. 3, the side walls are provided with horizontally extended notches H which are open at the front edges of said side walls.

Referring now to the front portion C of the meter box A, it will be noted in Fig. 2 that this portion includes a front wall J which is provided with an outwardly extended dome portion K having a sight opening K' formed therein, through which a meter within the box may be viewed for reading purposes, this sight opening being covered by a sheet of glass L which is suitably held in place in a secure manner, for instance, in the manner illustrated in Fig. 4. The front portion of the meter box A includes also side walls M which are of reduced width at their lower ends, as indicated at M' in Fig. 2, and the lower ends of these narrower portions M' of the side walls of the front portion C of the box are joined by the bottom wall N of said front portion which is of approximately the same width as the portions M' of the side walls M. The side walls of the front portion C of the meter box A are provided with inwardly extended, headed pins P which, when the meter box is assembled in its closed position, are seated in the notches H formed in the side walls of the base portion B of the meter box.

Formed through the front wall J of the front portion C of the meter box A is an opening 1, and fixedly secured to the inner face of said front wall of said front portion of the meter box is a seal-locking element 2. This seal-locking element comprises a flat section of material having a plurality of inwardly extended, radial spring fingers 3 which, when in use, are curved inwardly, as shown to the best advantage in Figs. 5 and 6. It will be noted from Fig. 2 that normally the spring fingers 3 are substantially straight and that the inner ends of said spring fingers are disposed in a circle which is somewhat smaller in diameter than the opening 1. Also secured to the inner face of the front wall J of the front portion of the meter box A is a rigid, yoke-shaped strap 4. The opposite end portions 4a of the strap 4 contact with and are secured to the inner face of the front wall J of the front portion of the meter box beyond opposite sides of the seal-locking element 2, as shown in Fig. 2, and said rigid strap includes portions 4b which extend inwardly from said end portions and a bridge portion 4c which connects said portions 4b and is disposed in inwardly spaced relation with respect to the front wall J. The bridge portion 4c of the rigid strap 4 is provided with an opening 5 formed therethrough which serves a purpose to be hereinafter set forth.

The opening 5 referred to is alined, when the portions B and C of the meter box A are assembled to provide the closed meter box, with a screw-threaded opening 6 formed through an upstanding leg of a substantially L-shaped element 7 which is secured to the bottom wall F of the base portion B of the meter box. In order to secure the portions B and C of the meter box in assembled relationship so as to provide the closed meter box, a fastening device 8 in the form of a screw is passed through the opening 5 formed in the bridge portion 4c of the rigid, yoke-shaped strap 4, and this fastening device is screwed into and through the screw-threaded opening 6 formed in the L-shaped element 7, as shown in Fig. 5. The fastening device 8 preferably has a washer 9 associated with it which is interposed between the head of the fastening device and the adjacent face of the bridge portion of the yoke-shaped strap 4. Preferably the fastening device 8 has mounted on it suitable means, such as a nut or a fixedly located washer 10 which prevents said fastening device from being completely detached from the yoke-shaped strap 4 when the front portion C is removed from the base portion B of the meter box.

In order to seal the opening 1 so that unauthorized persons may not have access to the fastening device 8 for the purpose of surreptitiously removing the front portion of the meter box, a seal 11 is provided. This seal is preferably, though not necessarily, made of glass and includes an outer portion 11a of greater diameter than the opening 1 and a portion 11b which extends from said larger outer portion and is of such diameter that it may be passed through the opening 1, as shown in Fig. 5. The seal 11 has a cavity 12 formed therein, and in the circumferential face of the portion 11b thereof an annular notch 13 is formed, said notch being provided with an inclined face and a straight, rear wall which is disposed at a substantial right angle relative to the axis of the seal. In arranging the seal 11 in place in the opening 1, the portion 11b thereof is passed through said opening and the inwardly moving portion 11b will contact with the spring fingers 3 of the seal-locking element 2 and spread said spring fingers outwardly, thus permitting said portion 11b to move through the circular group of fingers. When the seal has been moved inwardly until the face 11c of the seal contacts with the outer face of the front wall J, the outer ends of the spring fingers will snap into the annular groove 13 and engage the straight wall thereof as shown in Fig. 5, whereby the seal is securely locked against withdrawal from the opening 1.

In the use of the improved meter box disclosed herein, the representative of a power company who is to seal the box will arrange the front portion C of the meter box in assembled relation with respect to the base portion B thereof, with the pins P of the front portion seated in the notches H of the base portion and with the other parts of the portions B and C of the meter box in their proper assembled relationship. A screwdriver or other suitable tool will then be passed through the opening 1 and the fastening device rotated to cause said fastening device to be screwed into and through the screw-threaded opening 6 in the L-shaped element 7 of the base portion of the box. When the portions B and C of the meter box have been properly fastened together by the fastening device 8 the seal 11 is introduced in place in the opening 1 and locked therein as already explained, so that it may not be removed. If an unauthorized person seeking to gain access to the meter within the box for the purpose of tampering with the same attempts to pry the seal 11 from the opening 1, he will break said seal, as it may not be otherwise removed, and this condition will show that the meter box has been opened, or at least tampered with.

As an additional means of detecting tampering with the meter boxes, the power companies may provide their authorized representatives with small stickers which will be applied to the inner face of the forward portion of the seal, as indicated in Figs. 1 and 5, wherein the reference character 14 designates the sticker. These stickers will have applied thereto in the handwriting of authorized persons such matter as the dates on which boxes were sealed and the initials of the persons who sealed said boxes. If, therefore, unauthorized persons were able in some manner to obtain duplicate seals which might be employed in sealing meter boxes after the original seals had been broken in gaining access to the boxes, these persons would be faced with the additional problem of obtaining stickers and imitating the handwriting which appeared on the stickers associated with the original seals that were destroyed when the original seals were broken.

From the foregoing it is obvious that any attempts made by unauthorized persons to gain access to the interior of a meter box constructed and arranged in accordance with this invention would be readily detected.

I claim:

1. A seal for a receptacle having a displaceable closure member, comprising a sealing element formed of readily breakable material adapted to close an opening formed in a portion of said receptacle through which access may be had to a securing member for fastening said closure member in the closed position, said sealing element being provided with a groove, and means for securing said sealing element in said opening, said means comprising an element secured to a portion of the receptacle adjacent to said opening and having a plurality of radially disposed, yieldable fingers adapted to be displaced by said sealing element when same is being introduced into the sealing position in said opening and movable into said groove of the sealing element when said sealing element has reached the sealing position so as to prevent removal of the sealing element without breaking same.

2. A seal for a receptacle having a displaceable closure member, comprising a sealing element formed of readily breakable material adapted to close an opening formed in a portion of said receptacle through which access may be had to a securing member for fastening said closure member in the closed position, said sealing element being provided with an annular groove, and means for securing said sealing element in said opening, said means comprising an element secured to a portion of the receptacle adjacent to said opening and having a plurality of radially disposed, yieldable fingers adapted to be displaced by said sealing element when same is being introduced into the sealing position in said opening and movable into said groove of the sealing element when said sealing element has reached the sealing position so as to prevent removal of the sealing element without breaking same.

3. A seal for a receptacle having a displaceable closure member, comprising a sealing element formed of readily breakable material adapted to close an opening formed in a portion of said receptacle through which access may be had to a securing member for fastening said closure member in the closed position, said sealing element being provided with an annular groove, and means for securing said sealing element in said opening, said means comprising an element secured to a portion of the receptacle adjacent to said opening and having a plurality of radially disposed, yieldable fingers adapted to be displaced by said sealing element when same is being introduced into the sealing position in said opening and movable into said groove of the sealing element when said sealing element has reached the sealing position so as to prevent removal of the sealing element without breaking same, said sealing element being provided with an annular flange portion at its outer end which is adapted to contact with a face portion of said receptacle located adjacent to the opening in which the sealing element is disposed.

4. A seal for a receptacle having a displaceable closure member, comprising a sealing element formed of transparent and readily breakable material adapted to close an opening formed in a portion of said receptacle through which access may be had to a securing member for fastening said closure member in the closed position, said sealing element being provided with a groove, means for securing said sealing element in said opening, said means comprising an element secured to a portion of said receptacle adjacent to said opening and having a plurality of radially disposed, yieldable fingers adapted to be displaced by said sealing element when same is being introduced into the sealing position in said opening and movable into said groove of the sealing element when said sealing element has reached the sealing position so as to prevent removal of the sealing element without breaking same, and a layer of material adhesively secured to an inner face of said sealing element and having informative indicia applied thereto.

5. A seal for a receptacle having a displaceable closure member, comprising a sealing element formed of readily breakable material adapted to close an opening formed in a portion of said receptacle through which access may be had to a securing member for fastening said closure member in the closed position, said sealing element being provided with shoulder means, and means for securing said sealing element in said opening, said means comprising an element secured to a portion of the receptacle adjacent to said opening and having opposed fingers adapted to be displaced by said sealing element when same is being introduced into the sealing position in said opening and movable into contact with said shoulder means of the sealing element when said sealing element has reached the sealing position so as to prevent removal of the sealing element without breaking same.

WALTER A. HEINRICH.